US 008260454B2

(12) United States Patent
Checketts

(10) Patent No.: US 8,260,454 B2
(45) Date of Patent: Sep. 4, 2012

(54) AUTOMATED STORAGE SYSTEM

(75) Inventor: Stanley J. Checketts, Providence, UT (US)

(73) Assignee: Boomerang Systems, Inc., Florham Park, NJ (US)

(*) Notice: Subject to any disclaimer, the term of this patent is extended or adjusted under 35 U.S.C. 154(b) by 998 days.

(21) Appl. No.: 12/032,671

(22) Filed: Feb. 16, 2008

(65) Prior Publication Data
US 2008/0208389 A1 Aug. 28, 2008

Related U.S. Application Data

(60) Provisional application No. 60/890,309, filed on Feb. 16, 2007.

(51) Int. Cl.
G06F 7/00 (2006.01)
G06F 17/00 (2006.01)
E04H 6/00 (2006.01)

(52) U.S. Cl. ........ 700/213; 700/214; 700/217; 700/226; 700/232; 414/234; 414/239; 414/253; 414/255; 414/259; 414/260

(58) Field of Classification Search .................. 700/213; 414/234, 239, 253, 255, 259, 260
See application file for complete search history.

(56) References Cited

U.S. PATENT DOCUMENTS

| 5,018,926 A | * | 5/1991 | Sternad | 414/253 |
|---|---|---|---|---|
| 5,024,571 A | * | 6/1991 | Shahar et al. | 414/231 |
| 5,173,027 A | | 12/1992 | Trevisani | |
| 5,281,069 A | | 1/1994 | Tsujimoto | |
| 5,292,218 A | | 3/1994 | Ikenouchi et al. | |
| 5,314,284 A | | 5/1994 | Tsai | |
| 5,320,473 A | | 6/1994 | Arnold et al. | |
| 5,328,315 A | | 7/1994 | Sakamoto et al. | |
| 5,331,781 A | | 7/1994 | Gilbert | |
| 5,333,987 A | | 8/1994 | Takaoka | |
| 5,338,145 A | | 8/1994 | Beretta | |
| 5,467,561 A | | 11/1995 | Takaoka | |
| 5,487,636 A | | 1/1996 | Mkrtchyan | |
| 5,573,364 A | | 11/1996 | Schneider et al. | |
| 5,669,753 A | | 9/1997 | Schween | |
| 5,678,972 A | | 10/1997 | Bockler et al. | |
| 5,707,199 A | * | 1/1998 | Faller | 414/239 |
| 5,810,539 A | | 9/1998 | Zhang et al. | |
| 5,851,098 A | | 12/1998 | Buckenauer et al. | |
| 5,863,171 A | | 1/1999 | Engman | |
| 5,868,540 A | | 2/1999 | Hirose et al. | |
| 5,961,270 A | | 10/1999 | Ortega et al. | |

(Continued)

OTHER PUBLICATIONS

SpaceSaver Parking Company, "Parksafes," www.spacesaverparking.com/parksafe/parksafe.html.

Primary Examiner — Gene Crawford
Assistant Examiner — Yolanda Jones
(74) Attorney, Agent, or Firm — Graham Curtin, PA

(57) ABSTRACT

An automated storage system comprises a plurality of storage locations, at least one access location, a plurality of storage containers provided on the storage locations, a control system and at least one user interface, the control system further comprising a retrieval mode and a storage mode, and a delivery system for delivering a storage container from a storage location to an access location during the retrieval mode, and for returning the storage container to a storage location during the storage mode. User instructions at the control interface initiate the retrieval mode and the storage mode, and a user is provided access to the retrieved storage container while it is located at the access location.

18 Claims, 8 Drawing Sheets

U.S. PATENT DOCUMENTS

| | | |
|---|---|---|
| 6,077,017 A | 6/2000 | Durant |
| 6,085,124 A | 7/2000 | Choi |
| 6,241,453 B1 | 6/2001 | Upmeyer |
| 6,336,781 B1 | 1/2002 | Doppelmayr et al. |
| 6,491,488 B1 | 12/2002 | Vita et al. |
| 6,502,011 B2 | 12/2002 | Haag |
| 6,641,351 B2 * | 11/2003 | Payne ............................ 414/234 |
| 6,662,077 B2 | 12/2003 | Haag |
| 6,851,921 B2 | 2/2005 | Haag |
| 7,316,536 B2 * | 1/2008 | Evans et al. .................... 414/270 |
| 2004/0258506 A1 | 12/2004 | Haag |
| 2005/0220594 A1 | 10/2005 | Haag |
| 2007/0031218 A1 * | 2/2007 | Haag .............................. 414/227 |
| 2007/0032903 A1 | 2/2007 | Tsujimoto |

\* cited by examiner

Sample A

| Building Footprint | 3,200 SF |
|---|---|
| Parking Footprint | 1,200 SF |
| Total Footprint | 4,400 SF |
| Stories | 6 |
| Building Height | 57' |
| Standard Unit Size | 12' x 8' |
| Rentable Drive Up Units | 93 |
| Rentable SF | 8,928 |
| Rentable SF/Footprint SF | 2.03 |

Sample C

| Building Footprint | 6,400 SF |
|---|---|
| Parking Footprint | 2,400 SF |
| Total Footprint | 8,800 SF |
| Stories | 6 |
| Building Height | 57' |
| Standard Unit Size | 12' x 8' |
| Rentable Drive Up Units | 186 |
| Rentable SF | 17,856 |
| Rentable SF/Footprint SF | 2.03 |

AUTOMATED STORAGE SYSTEM

CROSS-REFERENCE TO RELATED APPLICATIONS

This application claims the benefit of U.S. Application 60/890,309, filed Feb. 16, 2007, the contents of which are incorporated herein by reference.

FIELD OF THE INVENTION

The present invention relates to storage systems in general, and more particularly to an automated storage system designed to maximize storage capacity using a minimal amount of property.

BACKGROUND

For years, self storage was a "build it and they will come" business, but greater competition has driven developers to seek out premium locations and to build vertically to justify the cost of land. While a number of companies have entered the market to provide pre-engineered multi-story structures with relative cost efficiency, innovation in that area has been limited.

Regardless of whether a self storage facility is on a single level, such as a sprawling outdoor facility, or a multi-story building in a rural or urban environment, each storage location has an associated amount of overhead that must be accommodated by the facility owner. For example, outdoor facilities usually allow for several car widths in front of each storage location, while indoor facilities usually provide hallways wide enough to accommodate utility carts or the like. Outdoor facilities also provide roadways adjacent the storage locations, while indoor facilities provide interconnecting hallways, stairways, elevators and associated safety features such as fire escapes and the like. While this additional space is only used sporadically, it is a required feature of the storage property and must be provided on a full-time basis for the benefit of customers.

Indoor and outdoor facilities may also provide other amenities such as appropriate lighting, vending machines, bathrooms, office space for onsite personnel, security gates, security cameras, alarm systems and the like. Self storage facilities that allow twenty-four hour access also create opportunities for thieves, vandals and other undesirables who may deter certain users from taking advantage of unlimited access to the facility. Accordingly, for each storage location at a given site, there is an associated amount of extra space necessary to accommodate user access and traffic, as well as an associated amount of additional resources directed to human amenities, security and the like.

This level of overhead adds considerably to the cost of the self storage location and operation that is ultimately passed onto customers. There is a need, therefore, for a self storage system that overcomes the need for human-related overhead, that is efficient to construct and operate, and that does not require additional space or property necessary to accommodate sporadic human access.

SUMMARY

An automated self storage system is provided with a plurality of storage locations at multiple levels of a facility, at least one access location for access by a user, and a plurality of storage containers provided on the storage locations. A control system having at least one user interface operates in a retrieval mode and a storage mode, such control system instructing a delivery system for delivering a storage container from a storage location to an access location during the retrieval mode, and for returning the storage container to a storage location during the storage mode. User instructions at the control interface initiate the retrieval mode, whereby a user is provided access to the retrieved storage container while it is located at the access location. Subsequent user instructions at the control interface initiate the storage mode, whereby user access to the container is removed and the storage container is returned to a storage location.

DETAILED DESCRIPTION OF THE PREFERRED EMBODIMENTS

Figure 1:
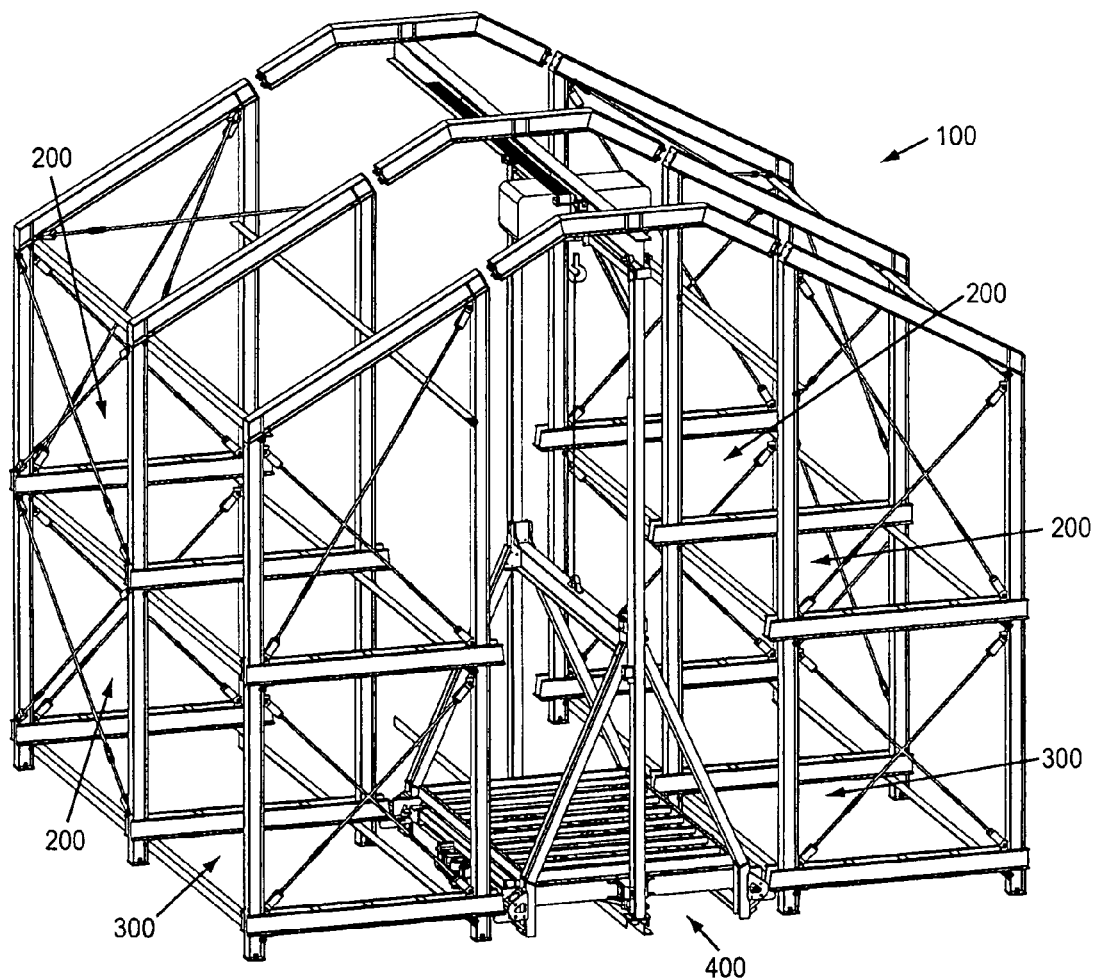
FIG. 1 is a framework rendering of one embodiment of an automated multi-level storage facility of the present invention.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Overall Components

Figure 2:
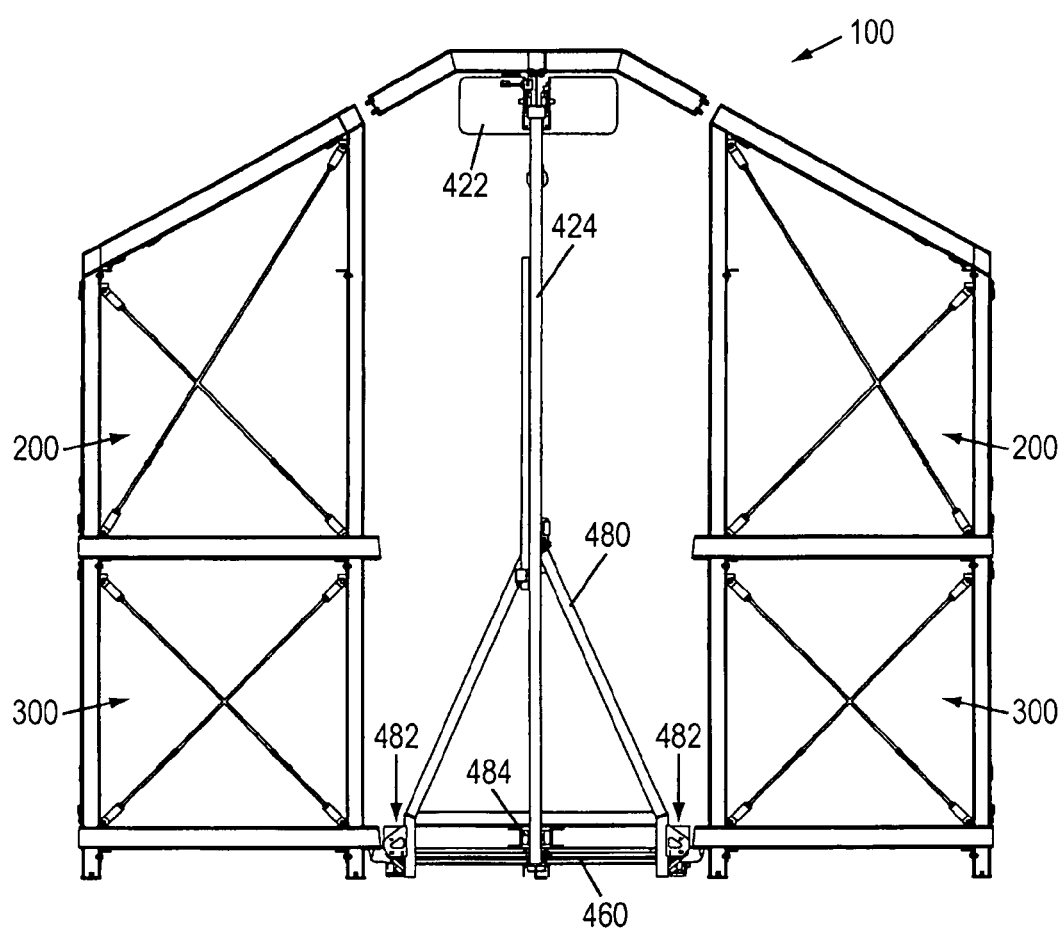
FIG. 2 is an end view and FIG. 3 is a side view of one embodiment of a storage facility of the invention.
Figure 3:
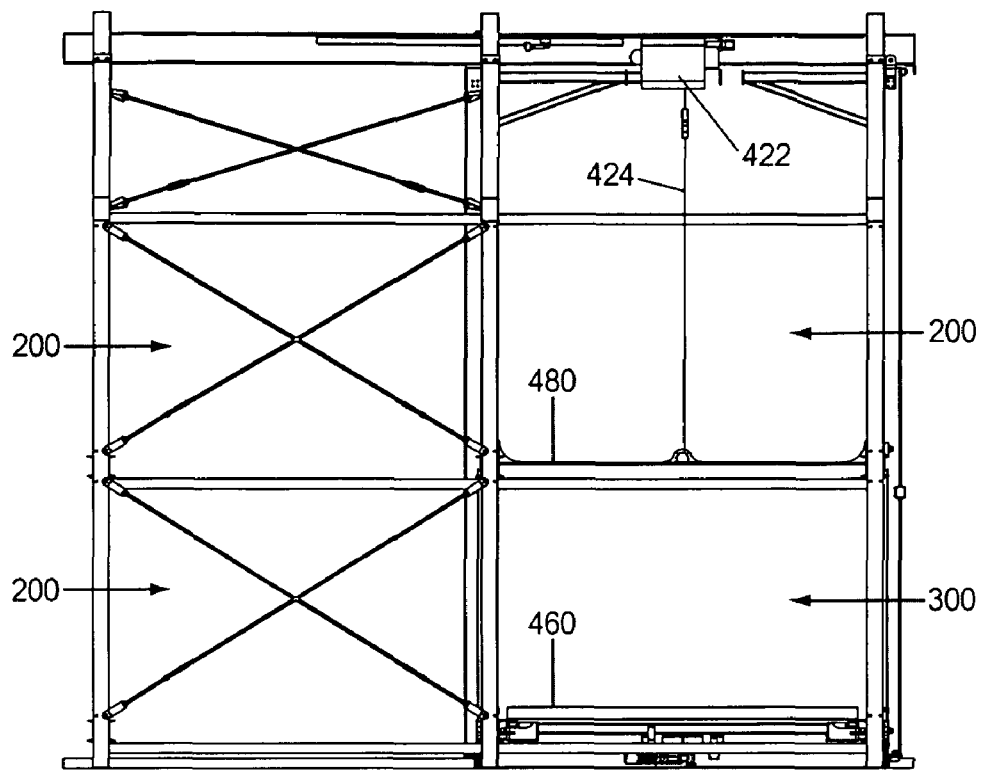
Figure 4:
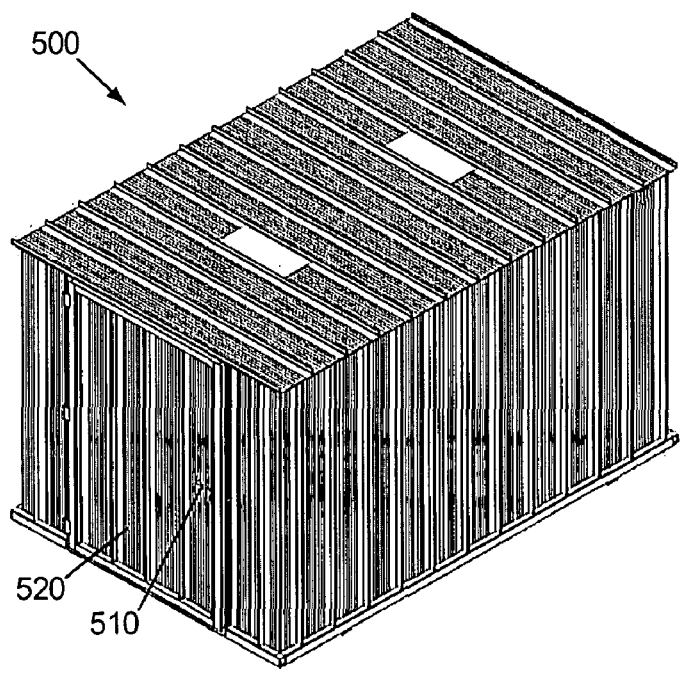
FIG. 4 is an example of a storage container used in the present invention.
Figure 5:
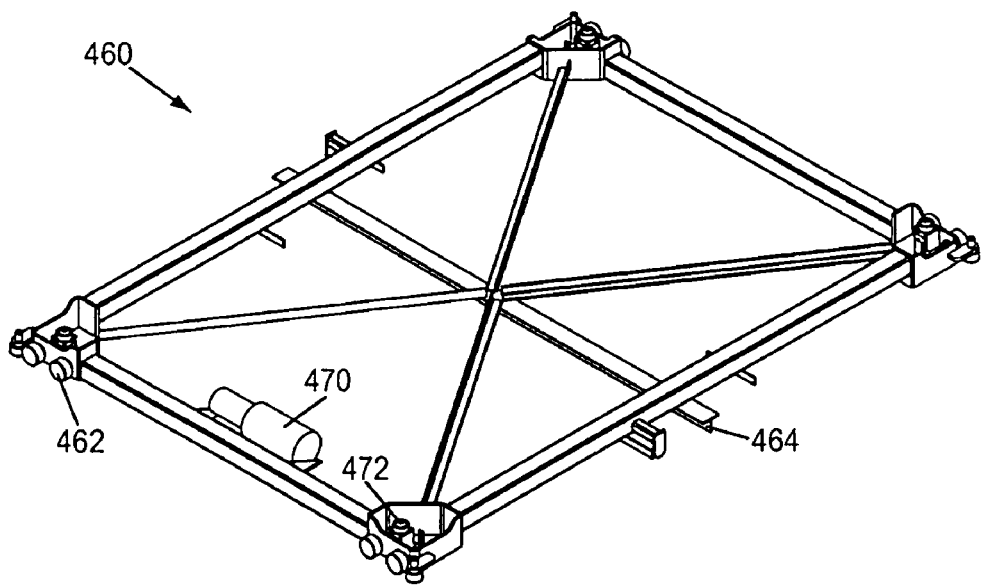
FIG. 5 illustrates a cart used in the present invention.

FIGS. 1-3 are framework renderings of one embodiment of an automated multi-level storage facility 100 comprising a plurality of storage locations 200 on various levels of the facility 100, at least one access location 300 for access by a user, and a delivery system 400 for delivering objects, such as storage containers 500 (FIG. 4), between the at least one storage location 200 and the at least one access location 300. A control system 600 is associated with the delivery system 400 for coordinating the proper retrieval and delivery of the object 500 from the storage location 200 to the access location 300, and a control interface 650 is associated with the control system 600 for receiving instructions from a user related to the identification of the appropriate storage location 200 of the user's object 500, and the direction of the delivery system 400 for retrieval of the user's object 500 from the storage location 200 to the access location 300.

The system of the present embodiment automatically moves the containers 500 to and from access locations 300 as they are called for by patrons using personalized security codes input at the control interface 650. The facility 100 is preferably equipped with multiple access locations 300 to allow several users to access their containers 500 simultaneously. Each access location 300 is preferably equipped with an automatic security door and a keypad interface 650 for entering access codes.

The storage locations 200 are preferably only accessed by the delivery system 400, which, as will be discussed below, requires a minimal amount of access space as compared with traditional self storage systems that require a considerable amount of space for human access as discussed in the "Background" section above. Containers 500 (which can also be an object such as an automobile) are delivered from the storage locations 200 to the at least one access location 300 by the delivery system 400, under instructions provided by a user at the control interface 650, and such containers 500 are preferably only accessed by users at the access location 300. Therefore, instead of a user directly accessing a 12'×8' room or container at a dedicated storage location, as in a traditional self storage facility, such container is automatically delivered from a preferably non-dedicated storage location 200 to a central or common access location 300 for direct (i.e., drive-up) access by the user. After access to the container has been completed, the container is automatically delivered to an available storage location 200 until the next time access is desired or requested by the user. A restricted user access location 300 overcomes the need to provide separate user access space associated with each storage location 200, and allows the owner of the storage facility 100 to focus the overhead elements (as discussed in the "Background" section) to a much smaller footprint related to the access location 300. Furthermore, the combination of the control interface 650, control system 600 and delivery system 400 create a totally automated environment that can allow the storage facility to operate with minimal, if any onsite personnel.

The facility 100 is preferably a multi-story steel building that is preferably constructed of I-Beams, channels and angles. I-beams are preferably used as the vertical support columns, channels are preferably used as the transfer and support surface for storing containers, and angle iron is preferably used for cross bracing the structure. The columns are designed to support all of the system components, and the structure is engineered to withstand the effects of wind load and seismic events. Of course, while steel I-beams, channels and angles are disclosed, other structural components made from other materials can be used.

The facility 100 is preferably constructed in a modular fashion using parts that can be salvaged and reused as desired. On the commercial side, this allows for easier financing and temporary land use. A modular, multi-level construction can also be erected in a fraction of the time necessary to erect a traditional multi-level self-storage facility. As shown in FIG. 1, the majority of the facility 100 constitutes a framework construction, where the I-beams and channels form a simplified support structure for receiving and storing movable objects or containers 500. Since the containers 500 are housed within storage locations 200 that are not exposed to the public or the elements, the constructional specifications for containers 500 do not have to be as stringent. For example, the container walls do not have to be opaque and solid for purposes of privacy concerns, and therefore unnecessarily heavy, but can be primarily wire fencing, for example, since the contents of the containers are not open to public inspection. This would allow the facility owner to provide containers that are lighter than traditional six-walled boxes, for example, without sacrificing structural integrity. Of course, a greater security benefit is obtained if the containers are formed from impenetrable steel or the like.

The concept of accessing containers 500 through dedicated access locations 300, as opposed to through dedicated storage locations, conveys several benefits to both the facility owner and the user. With traditional multi-story self storage facilities, the first floor usually includes certain, exterior-facing storage units with drive up access. These are considered premium locations with premium price tags. The remaining interior first floor units and all of the upper level units are generally only accessible by cart and/or elevator, requiring the user to make multiple trips with a reduced load over what could be a considerable distance and time. Of course, these units traditionally cost less than the premium locations. With the facility of the present embodiment, from the owner's perspective, the use of dedicated access location 300 can focus foot traffic and user access to a defined and contained location on the ground level, and it is no longer necessary to provide safe and secure hallways, fire escapes, etc. The owner needs to light, make available and secure only a small portion of the storage facility footprint. In addition, because all units now include drive up access, the owner is able to charge a premium or semi-premium rate for all units, while saving costs associated with reduced user access overhead.

From the user's perspective, the use of dedicated access locations provides immediate, drive-up access to all storage containers irrespective of the present storage location of such container, which is possible through the "on demand" delivery of the container (or object) from the storage location to the access location. Thus, the user is able to save a considerable amount of time while accessing the container, which makes the access experience much more enjoyable. In addition, users will appreciate that the premium or semi-premium pricing is justified by the convenience of "on demand" container delivery and storage, and minimal travel required between the container and the user's vehicle.

Figure 8:
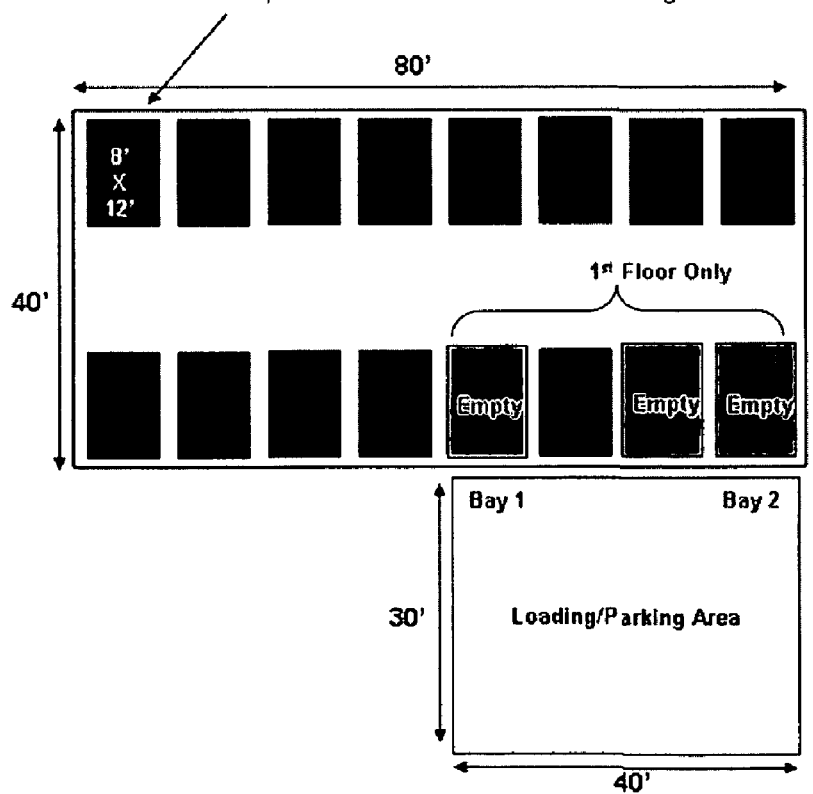
FIGS. 8-10 illustrate three different storage configurations usable for a storage facility of the present invention.
Figure 9:
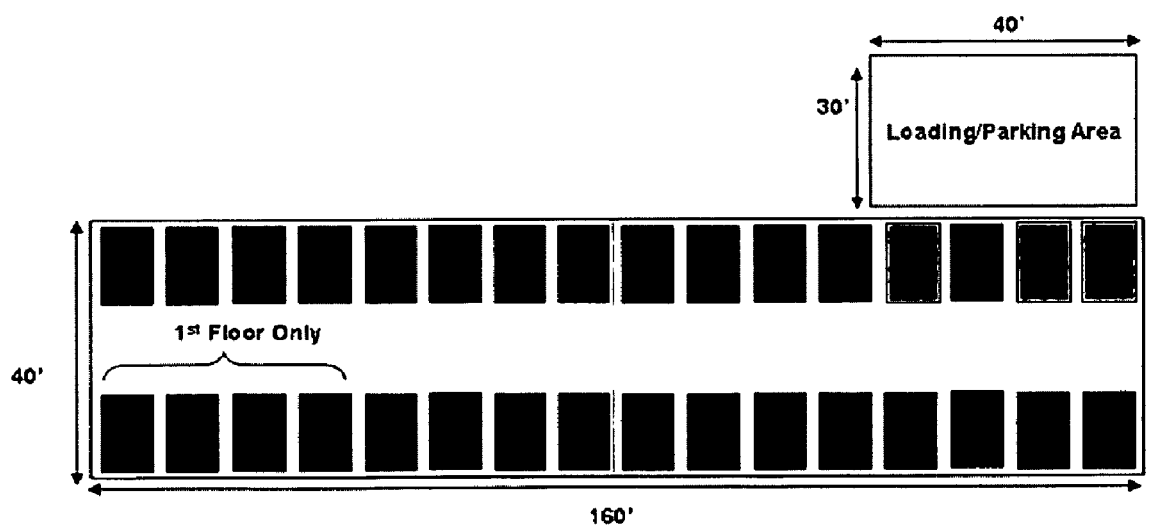
Figure 10:
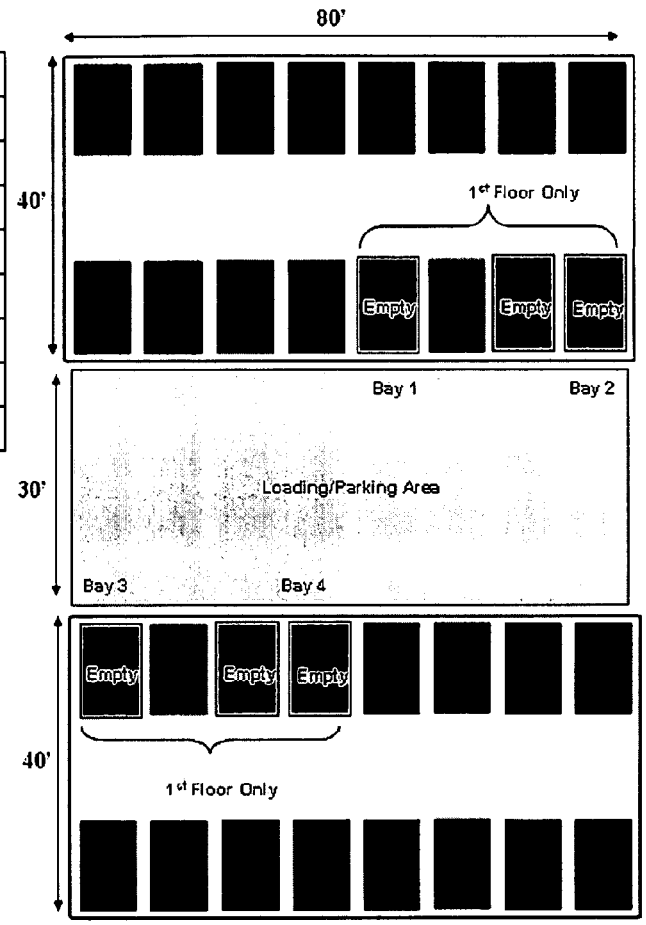

The above discussion touches on a major benefit of using the system of the present invention. In a traditional self-storage facility, the building footprint may be eclipsed in size by the parking footprint, or the footprint required for user access (parking, hallway access, etc). With any facility constructed in accordance with the present invention, the building footprint is generally always greater than the parking footprint. FIGS. 8-10 illustrate three sample configurations A, B and C that show minimal parking footprints relative to the building footprints. By confining the parking footprint to the access bays or locations 300, and by avoiding the need for user access space by each storage location 200, and by avoiding the need for hallways, fire escapes, elevators, additional parking and the like, the facility owner is able to maximize the rentable space with a minimal footprint.

Discussion of Separate Components

Returning now to a discussion of the primary elements of the system of the present embodiment, the storage locations 200 within the facility 100 are preferably not accessible to the public, but are only accessible to the delivery system 400. Such locations do not have to provide the equivalent of solid ground for each container 500, but simply have to provide enough support to prevent the container (or object) 500 from falling or collapsing. As shown in FIG. 1, the storage location 200 could simply consist of a spaced apart pair of channels on which is seated opposite edges of a container 500. As will be discussed in more detail in connection with the delivery system 400, these channels provide sufficient space for the delivery system to engage the container 500 from below, lift the container 500 from the channels and the storage location 200, and deliver the container 500 to the access location 300.

The access location 300 is preferably provided on the ground level of the facility 100 and is primarily used for the loading and unloading of items to and from the containers 500. Several access locations may be provided in a centralized location (see FIGS. 8-10) to maximize the efficient amount of space required for a loading and/or parking area relative to both the storage facility 100 and the access route to the storage facility from the main road. Alternatively or additionally, access locations 300 may be provided in non-consecutive locations around the perimeter of the facility if desired, such as if the facility occupies a city block and access was desired from all four sides or streets. If concentrated in a central location, the access areas are similar to an elevator bay in a hotel.

Each access location 300 is preferably blocked by a security door that only opens when a user's container 500 is delivered to an access position behind such door. Otherwise, the access location 300 is an empty location equivalent to an unused storage location 200. Similar to that of an elevator door, a security door in the access location 300 is necessary for several reasons. First, the security door prevents access to the interior of the storage facility and to other storage containers 500, which access is normally blocked by a container 500 when the security door is unlocked and opened. Since the interior of the facility is not suited or intended for normal foot traffic, it can present a considerable safety issue to any inadvertent guests. Second, the security door prevents a user from colliding with the storage container 500 as it is being delivered to the access location by the delivery system 400. An appropriate sensor system that scans the access location before delivery of the storage container can also be used to prevent a collision between a user and a storage container 500.

Third, a security door can create a façade to mask the fact that the door is an access to a storage system. For example, if a storage facility of the present invention is situated in the basement of a fancy ocean-side resort, where guests can store their swimming and snorkeling equipment, scuba equipment, surfing equipment, bicycles, rafts, boats, etc., the security door can create the appearance of a guest room in the resort, or a cabana, or the like. The access door can be decorated in a manner that is consistent with the adjacent exterior. In a more urban environment, such as a street lined with brownstones for example, the access door of an underground facility can be designed to look like a basement apartment door, which can ease neighborhood concerns about having a self storage facility in its backyard.

The delivery system 400 is an integral part of the operation of the storage facility 100. Guided by the control system 600 under direction from the control interface 650, both of which will be described in detail below, the delivery system 400 automatically retrieves a container 500 (or object) from a storage location 200 and delivers the same to an access location 300 for access by a user. After the user finishes accessing the container 500, the delivery system returns the container to an empty storage location 200. The delivery system 400 is comprised of a hoist system 420 that lifts and lowers the containers 500 to various levels of the storage facility 100; a trolley system to move the containers 500 horizontally to the various storage locations 200; a cart 460 having an optional support tray 465 that moves under the container 500 to lift and retrieve it from the storage location 200 or access location 300; and a caddy 480 that holds cart 460 when transporting container 500 from one part of the storage facility 100 to another.

The hoist system 420 consists of a VFD (Variable Frequency Drive) controlled hoist brake motor 422 to move the containers 500 in the vertical direction between the various levels of the storage facility 100. The hoist 420 is designed to lift a container 500 from each of the four corners, which provides stability of the container when being transported. The hoist motor 422 is preferably includes gear boxes and drive shafts attached to four driven chain sprockets and chains. The hoist position and speed are preferably monitored using an encoder feedback type system.

The trolley system consists of two VFD (Variable Frequency Drive) controlled brake motors, as well as gear boxes, drive wheels, and guide rails. The trolley system moves the containers 500 in the horizontal direction between the various storage and access locations of the storage facility 100. The trolley travels at high speed when moving between positions and slows as it nears its stopping position. The trolley is ramped between speed changes to minimize the instability of the container contents during movements. The trolley's position and speed are monitored using an absolute encoder feedback type system. The trolley system is preferably utilized in a single story facility, or where only horizontal movement is required. Otherwise, the cart and caddy system are utilized as described below.

Figure 6:
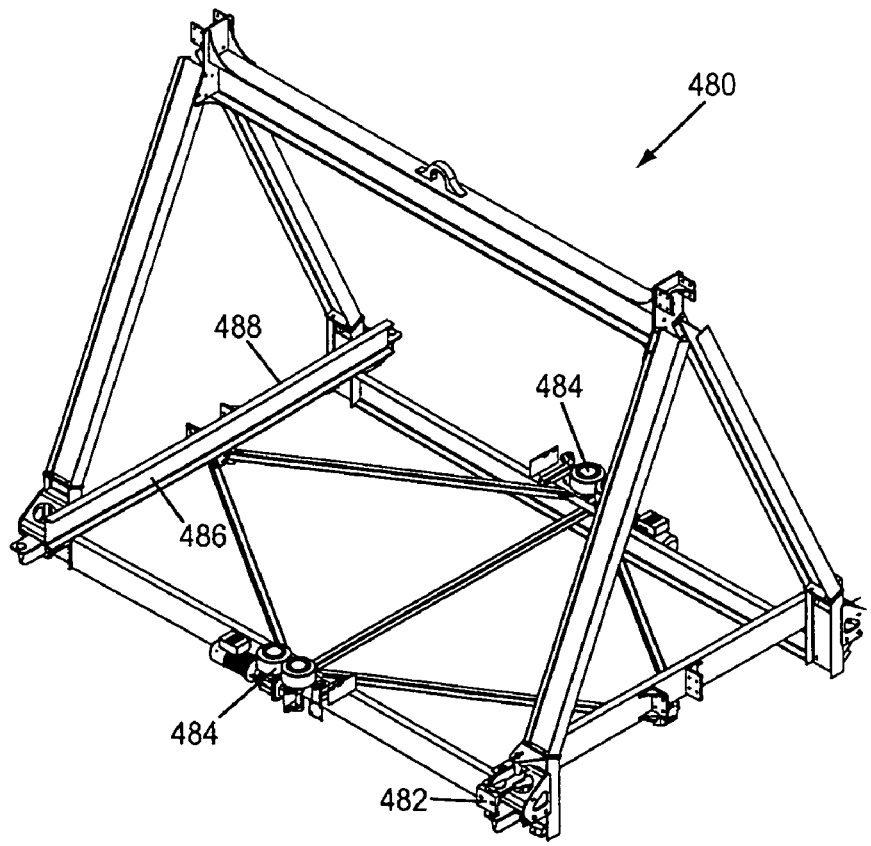
FIG. 6 illustrates a caddy used in the present invention.
Figure 7:
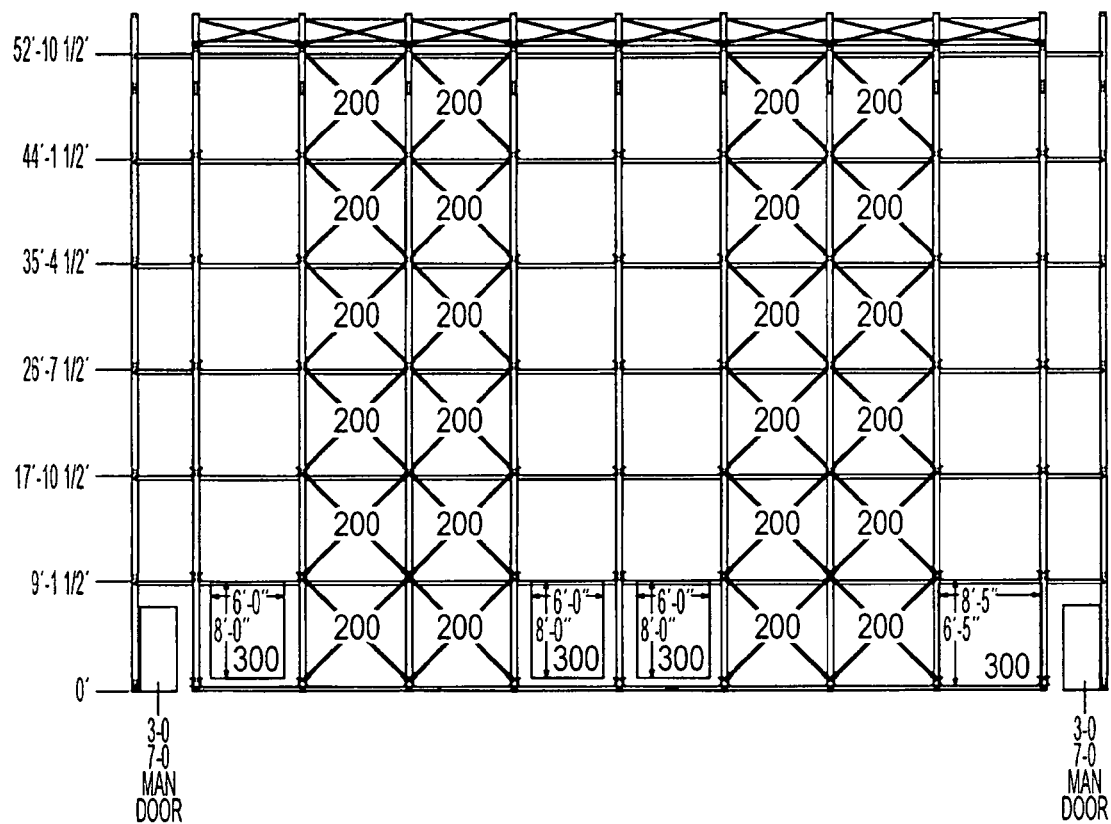
FIG. 7 illustrates a front view of one embodiment of a storage facility of the present invention.

The caddy 480 is the frame that is directly suspended from the hoist chains or cables 424. While the caddy 480 is shown in FIG. 3 and FIG. 6 with a single pickup or point of contact between the cables 424 and the caddy 480, it will be understood that different suspension arrangements are possible such as, for example, a four-point suspension comprising four cables, chains or other methods of attachment attached to the four corners of the caddy 480 or the cart 460 to improve the stability of the system in off-balance conditions. Other suspension arrangements are possible. A lock system 482 is in each of the four corners of the caddy 480 to lock the caddy 480 to the storage location 200. These locks 482 are preferably operated using an electric powered actuator. When the caddy 480 is in position at a storage rack, the actuators pivot the locks 482 into the locking position. The hoist 420 then lowers the caddy 480 and locks into the lock receivers located on the storage rack. This aligns and locks the cart 460 to the storage rack so containers 500 may be moved between the storage racks and the caddy 480. Each of the locks is monitored by the control system 600 using limit switches to verify that each lock is in the extended (i.e., locked) position and retracted (i.e., unlocked) position. The locks must be detected in the proper position before trolley, hoist, or cart movements.

The cart 460 sits on top of the base of the caddy 480 and moves from the caddy 480 into the storage locations 200 or access locations 300 via rollers 462 mounted to the cart 460. While on the caddy 480, the rollers 462 ride within channels 486 that function as storage rails 488 for supporting containers 500. The cart 460 is driven across the caddy 480 using four drive wheels 484 mounted to the caddy 480. These drive wheels 484 move the cart 460 by pinching a fin 464 that is mounted to the cart 460. The drive wheels 484 are driven by electric motors controlled by a VFD controller. The drive wheels 484 drive the cart 460 from the caddy 480 into and out of the storage positions or locations 200, and/or access locations 300, to retrieve and store containers 500.

The position of the cart 460 is monitored by the control system 600 using proximity sensors. These sensors are used to detect (1) whether the cart 460 is centered on the caddy 480, which must be detected before movement of the hoist 420 or trolley 440 is allowed, (2) whether the cart 460 is getting close to the center of the caddy 480, which is used to slow the cart movement as it approaches the center position of the caddy 480, (3) whether the cart 460 is getting close to the storage location 200, which is used to slow the cart movement as it approaches the storage location 200 of the containers 500, and (4) whether the cart 460 is at the storage location 200, which is used as the position to lift and lower containers 500 in the storage locations 200.

The cart 460 is provided with a lift system comprising a hydraulic pump 470, control valve, and four lift cylinders 472. The lift system is used to lift the containers 500 off the storage rails as they are moved into and out of the storage locations 200 or access locations 300. The lift system lifts a container 500 off the storage rails at the storage locations 200 or access locations 300 and is supported by the cart 460. The container 500 may then be moved horizontally to and from the caddy 480 using the cart 460. Each lift cylinder 472 is monitored with a proximity sensor to detect when it is in the raised or lowered position. These cylinders 472 must be detected in the correct position before movement of the cart 460 is allowed.

Figure 11:
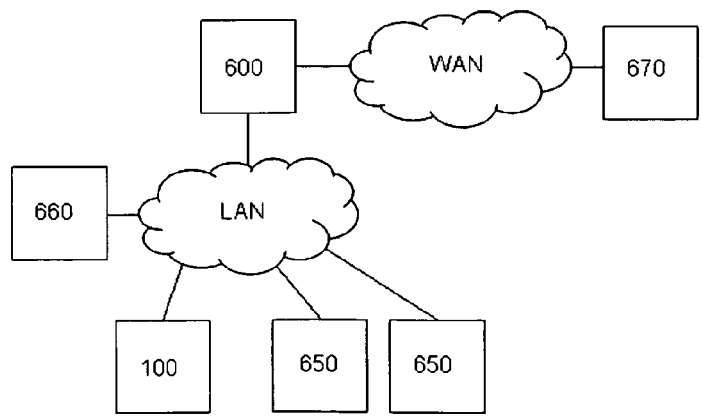
FIG. 11 illustrates one embodiment of a control system used in the present invention.

One embodiment of the control system 600 (FIG. 11) uses an Allen-Bradley Compactlogix Programmable Logic Controller (PLC), with an operator interface display or control interface 650. Operation and monitoring of all control and safety-related functions is governed by the control system 600, which can be accessed directly through the control interface 650, or through a local monitoring station 660 on site, or remotely at a remote monitoring system 670 via a modem, the Internet or the like. Technical support may link directly to the control system 600 for on-line troubleshooting assistance and control adjustments.

The control system 600 is designed for safety and redundancy. Maintenance personnel interface with the control system 600 using the control interface 650 to access setup, status, and fault information. Manual operation of components is also provided from the control interface 650 for testing and troubleshooting. The control interface 650 is preferably provided with several control switches and buttons, such as (1) a main disconnect, which switch opens the main AC power supplying the control system 600, and which also provides lockout capability, (2) a ten key keypad or touch screen display used by patrons to enter their access code requesting their container 500 to be retrieved and brought to the access location 300, and (3) a Store push button that is used by the Patron to tell the system 600 they are done accessing their container 500 and to put it back into storage. The control interface 650 is also provided to access certain owner-based screens, such as, but not limited to, (1) a screen that displays all currently active alarms detected by the control system 600, which alarms can be viewed and cleared from this screen, (2) a screen that displays the time/date stamped history of alarms detected by the control system 600, and (3) a screen used by maintenance personnel to access all screens. Alarms detected by the control system 600 are preferably annunciated to maintenance personnel using a cell phone paging system or other WAN-based system to notify them that a problem has occurred that requires attention.

The control interface 650 available to a patron or customer is preferably located in an enclosed room or booth, or is otherwise shielded from the elements. It should also be located in close proximity to the access locations 300, such as adjacent to the security door to the access location 300, or adjacent to each security door if there are multiple access locations 300, or at another centralized location such as the entrance to the storage facility 100. For example, a user might have to input the user's security code into the control interface 650 before access is granted to the facility 100, which security code would then activate the delivery system 400 to retrieve the user's container to a designated access location 300 that is communicated to the user after the security code is input into the control interface 650. In such an example, the user's container 500 would be immediately accessible upon arrival at the designated access location 300, which would eliminate waiting that would otherwise be required if the control interface 650 was first accessed by the user at the access location 300.

Operation

The storage facility 100 operates in either a retrieval mode or a storage mode. In the retrieval mode, in accordance with one embodiment, a patron drives his/her vehicle to an empty access location 300 within the loading/parking area of the storage facility 100. The patron enters his/her access code on the touch pad or screen of the control interface 650, which instructs the delivery system 400 to move the cart 460 and caddy 480 to the storage location 200 occupied by the user's container 500. The lock pins 482 on the caddy 480 engage to align and lock caddy 480 to the storage location 200. The cart 460 is then extended from the caddy 480 to the retrieval position under the container 500. The lift cylinders 472 raise the container 500 from the storage rails, and the cart and container combination are retracted from the storage location 200 onto the caddy 480. The lock pins 482 are disengaged, unlocking the caddy 480 from the storage location 200. The hoist system 420 then moves the caddy 480 with the container 500 to the access location 300. The lock pins 482 engage to align and lock caddy 480 to the access location 300, after which the cart 460 and container 500 are extended from the caddy 480 to the access location 300. The hydraulic lift cylinders 472 are then lowered, setting the container 500 on the access location support rails. The cart is then retracted from the access location onto the caddy 480 and the lock pins 482 are disengaged, unlocking the caddy 480 from the access location 300. The caddy 480 is then available for use by others.

The automatic security door is then automatically opened to allow a patron access to his/her container 500. Each container 500 preferably has a lock hasp 510 on the container door 520 to enable a patron to lock his container 500. In addition, the container door 510 preferably swings outward through the opening of the automatic security door and acts as a barrier to the premature or inadvertent closing of the security door. This artificial barrier prevents the container 500 from being returned to the storage location 200 while the patron as access to the container. Additional security measures could be employed to prevent a patron from becoming trapped in a container 500, such as (1) a sensor that prevents movement of the caddy 480 unless the container door 520 is locked, (2) a motion sensor, heat sensor or electro-optical detector provided in the container 500, (3) an alarm button in the container 500 on the inside of the container door 520, (4) an interior ladder that leads to a hatch door on the top of the container 500, and/or (5) a latch on the security door opening that receives the container door 510 and locks the container door 510 in an open position, with the latch being unlocked only if the patron hits a "Store" button on the control interface 650. Of course, other security measures can be implemented as desired.

After the patron is finished accessing the container 500, the patron activates the storage mode by pressing a "Store" button of the control interface 650. Of course, other methods of activation can be implemented in addition to the use of a "Store" button, with the "Store" button used here for purposes of illustration. The storage mode results in the closing of the automatic security door and the return of the container 500 to a storage location 200. The steps from the retrieval mode discussed above are simply reversed when returning the container 500.

As with the entire storage facility in general, the retrieval and storage modes are completely automated. This enables the owner to operate the facility without any onsite personnel.

If a problem occurs that triggers an alarm, a maintenance person can be automatically notified via a cell phone paging system, the Internet or the like, and the service can be performed if possible or on site with a relatively minor wait time.

In addition, it will be understood that the storage facility of the present invention can be used to store any type of item or object. For example, the storage facility could also be used to store smaller items such as, for example, bicycles or motorcycles, or larger items such as pleasure boats, or a combination of items of different sizes. A storage facility could be constructed with storage locations having a variety of different dimensions, and/or usable with a variety of different containers or platforms. Of course, from the perspective of the facility owner, it may be more efficient to have consistency in storage location and container dimensions, particularly in a modular construction that takes advantage of uniform construction materials. Also, the storage facility of the present invention need not be a free-standing building, but could be part of an existing facility, such as a basement in an apartment complex or a section of a single room.

Random Access Storage

It should be appreciated that the storage location assigned to the user's container does not have to be dedicated or permanent like with traditional self storage facilities. In other words, the user is purchasing a storage container, not a storage location, and the user should not care where the container is stored while it is not being directly accessed by the user at the access location. It is only necessary from the user's perspective that the correct container is delivered to the correct access location.

However, some users may be more discriminating than others and may wish to have the least amount of wait time between the entry of the security code at the control interface and the appearance of the container at the access location. Accordingly, the control system could be configured to have certain "reserved" open locations closer to the access locations that are only available to certain users. Of course, such locations would likely be more expensive due to the increased convenience. A facility owner could rectify the issue of wait times by implementing an efficient number of delivery systems and access locations for every "x" number of storage locations, and the arrangement of storage locations and access locations could be optimized so that the wait time is effectively the same regardless of the storage location.

Regardless of the construction of the facility or arrangement of the storage locations, the decision of where to store a container is an important one from an energy cost perspective. From the perspective of the facility owner, it costs more to deliver a container to a storage location that is farther away from the access location due to the energy expended by the delivery system. The container weight also factors into the energy needed to move the container. These increased energy costs could be offset to some extent by charging regular users more than periodic users, or by attributing a charge to each use of the facility in addition to an ongoing or monthly charge or the like. In addition, weight sensors could be implemented to both insure that the container has not exceeded the maximum allotted weight (e.g., 5000 lbs for a container that is 8'W×12'D×7'H), and/or to assess a weight surcharge similar to that assessed by airlines for checked baggage over a certain weight.

With newly populated storage facilities, the storage locations can be filled in order starting with the closest to the access location. However, it might not be most efficient to always select the closest open storage location during the storage mode. The control system may learn, for example, that certain users are more active than others. For such active users, it might be most efficient to seek out the closest open storage location. For non-active users, it might be beneficial to expend more energy during the storage mode to seek out a storage location that is farther away from the access location, and save the closer open storage locations for more frequent users. New users of the facility may, for example, be required to indicate their anticipated usage frequency so that the control system has a base frequency value for such user.

The control system is obviously crucial to the operation of an automated storage facility where the storage locations are selected somewhat at random. Not only does the control system have to associate the storage location with a particular user, but the control system should optimize the allocation of storage locations by certain variables such as, but not limited to, distance to the access location, access frequency and container weight.

The storage facility of the present invention transforms the need for dedicated access storage in favor of random access storage, and such a system can be applied to any system that is traditionally based on dedicated storage locations. Any location that utilizes lockers or bins for temporary storage could benefit from such as system, such as, but not limited to, airports, train stations, amusement parks, health clubs, movie theaters, bowling alleys (i.e., for shoes), retail locations or any place where the user is required to check something before entry. In each of these locations, space may be at a premium, and it is not efficient to take up valuable space with storage locations that are predominantly unused.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

I claim:

1. An automated storage system comprising:
   a) a plurality of storage locations;
   b) at least one access location;
   c) at least one storage container provided on at least one storage location;
   d) a control system and at least one user interface, the control system further comprising a retrieval mode and a storage mode;
   e) a delivery system for delivering the at least one storage container from a first storage location to the at least one access location during the retrieval mode, and for returning the at least one storage container from the at least one access location to a second storage location during the storage mode, wherein the first and second storage locations are different, and wherein the second storage location is not predetermined and is selected when returning the at least one storage container from the at least one access location;
   f) wherein user instructions at the control interface initiates the retrieval mode and the storage mode; and
   g) wherein user access is provided to the at least one storage container while the at least one storage container is at the at least one access location.

2. The automated storage system of claim 1, further comprising a plurality of access locations.

3. The automated storage system of claim 2, further comprising a plurality of user interfaces, one associated with each access location.

4. The automated storage system of claim 1, further comprising a plurality of storage containers.

5. The automated storage system of claim 1, wherein the second storage location is determined based on frequency of user access of the at least one storage container.

6. The automated storage system of claim 1, wherein the second storage location is determined based on the weight of the at least one storage container.

7. The automated storage system of claim 1, further comprising a security door that prevents user access to the at least one storage container while the at least one storage container is located at a storage location.

8. The automated storage system of claim 7, wherein the security door is automatically opened when the at least one storage container is positioned at the at least one access location.

9. The automated storage system of claim 8, wherein the security door is automatically closed when the user initiates the storage mode on the user interface.

10. The automated storage system of claim 1, wherein the storage locations are arranged on a multi-level facility.

11. The automated storage system of claim 1, wherein the delivery system further comprises a cart and a caddy, the caddy movable between the storage and access locations, the cart movable relative to the caddy for retrieving the at least one storage container from a storage and/or access location.

12. The automated storage system of claim 11, wherein the caddy further comprises a lock system for securing the caddy position relative to a storage or access position.

13. The automated storage system of claim 12, wherein the cart further comprises a lift system for raising the at least one storage container off a storage or access position.

14. A method of operating an automated self storage facility comprising:
   a) providing a plurality of storage locations, at least one access location and at least one storage container;
   b) providing a control system and a user interface, the control system further comprising a retrieval mode and a storage mode;
   c) providing a delivery system for delivering the at least one storage container from a first storage location to the at least one access location during the retrieval mode, and for returning the at least one storage container from the at least one access location to a second storage location during the storage mode, wherein the first and second storage locations are different, and wherein the second storage location is not predetermined and is selected when returning the at least one storage container from the at least one access location;
   d) receiving instructions at the user interface to initiate the retrieval mode for retrieval of an at least one storage container from the first storage location to the at least one access location;
   e) providing user access to the at least one storage container while the at least one storage container is at the at least one access location; and
   f) receiving instructions at the user interface to initiate the storage mode to return the at least one storage container to the second storage location.

15. The method of claim 14, wherein the second storage location is determined based on frequency of user access of the at least one storage container.

16. The method of claim 14, wherein the second storage location is determined based on the weight of the at least one storage container.

17. The method of claim 14, further comprising preventing user access to the at least one storage container while the at least one storage container is located at a storage location.

18. The method of claim 14, further comprising preventing user access to the at least one access location upon receiving instructions at the user interface to initiate the storage mode.

* * * * *